United States Patent
Ahn et al.

(10) Patent No.: US 8,896,577 B2
(45) Date of Patent: Nov. 25, 2014

(54) OPTICAL TOUCH SCREEN APPARATUSES AND METHODS OF DRIVING THE OPTICAL TOUCH SCREEN APPARATUSES

(75) Inventors: Seung-eon Ahn, Hwaseong-si (KR); I-hun Song, Seongnam-si (KR); Sang-hun Jeon, Seoul (KR); Young Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 126 days.

(21) Appl. No.: 13/422,384

(22) Filed: Mar. 16, 2012

(65) Prior Publication Data

US 2012/0280939 A1 Nov. 8, 2012

(30) Foreign Application Priority Data

May 3, 2011 (KR) ........................ 10-2011-0041992

(51) Int. Cl.
  *G06F 3/042* (2006.01)
  *G06F 3/041* (2006.01)
(52) U.S. Cl.
  CPC .............. *G06F 3/0412* (2013.01); *G06F 3/042* (2013.01)
  USPC ........................................................ 345/175
(58) Field of Classification Search
  USPC ........................................................ 345/175
  See application file for complete search history.

(56) References Cited

U.S. PATENT DOCUMENTS

| 7,535,010 | B2 | 5/2009 | Saito et al. |
| 2005/0116937 | A1 | 6/2005 | Choi et al. |
| 2006/0033016 | A1 | 2/2006 | Ogawa et al. |
| 2007/0268206 | A1 | 11/2007 | Kinoshita et al. |
| 2009/0268132 | A1 | 10/2009 | Takama et al. |
| 2009/0289915 | A1 | 11/2009 | Han et al. |
| 2010/0097838 | A1 | 4/2010 | Tanaka et al. |
| 2012/0267513 | A1* | 10/2012 | Jeon et al. ................... 250/208.2 |

FOREIGN PATENT DOCUMENTS

| EP | 2287657 A1 | 2/2011 |
| JP | 2005328352 A | 11/2005 |
| KR | 20070069500 A | 7/2007 |
| KR | 20090071156 A | 7/2009 |
| KR | 20090121097 A | 11/2009 |
| KR | 10-2011-0128049 | 11/2011 |
| WO | WO-2011024349 A1 | 3/2011 |

OTHER PUBLICATIONS

Extended European Search Report dated Jun. 27, 2014.

* cited by examiner

*Primary Examiner* — Fred Tzeng
(74) *Attorney, Agent, or Firm* — Harness, Dickey & Pierce, P.L.C.

(57) ABSTRACT

An optical touch screen apparatus in which an oxide semiconductor transistor is used as a light sensing device, and a method of driving the optical touch screen apparatus. The optical touch screen apparatus includes an array including a plurality of light sensing pixels for sensing incident light, a gate driver for providing each of the light sensing pixels with a gate voltage and a reset signal and a signal output unit for receiving a light sensing signal from each of the plurality of light sensing pixels to output a data signal. The gate driver includes a plurality of gate lines that provide a gate voltage to each of the light sensing pixels and at least one reset line that provides a reset signal to each of the light sensing pixels and is electrically connected to the plurality of light sensing pixels.

30 Claims, 8 Drawing Sheets

OPTICAL TOUCH SCREEN APPARATUSES AND METHODS OF DRIVING THE OPTICAL TOUCH SCREEN APPARATUSES

CROSS-REFERENCE TO RELATED APPLICATION

This application claims the benefit of Korean Patent Application No. 10-2011-0041992, filed on May 3, 2011, in the Korean Intellectual Property Office (KIPO), the entire contents of which is incorporated herein in its entirety by reference.

BACKGROUND

1. Field

Example embodiments relate to optical touch screen apparatuses and methods of driving the optical touch screen apparatuses.

2. Description of the Related Art

A touch screen is a device through which input data is directly received via a screen such that a touch by a person or by a pen on a position of a display screen is detected to be processed by software. To this end, a touch screen is formed by attaching a touch panel to a display panel to implement the above function. Examples of the touch panels are resistive overlay type, capacitive overlay type, surface acoustic wave (SAW) type, infrared beam type, and piezoelectric type touch panels. Recently, touch screens are widely used in various fields as input devices for replacing a keyboard or a mouse.

Touch screens are operated by touching a display device directly with a finger or by using a pen. However, as the size of display devices gradually increases, and a distance between the user and the display device is increased, the direct touching method may be difficult to apply. An optical touch screen, which performs the same function as touch screens, senses light instead of a touch by a finger or a pen. The optical touch screen is expected to be advantageous not only for communication between a user and a terminal but also for communication between users.

In order to implement an optical touch screen, a micro-sized light sensing device which is capable of sensing light is required. A typically used light sensing device is an amorphous silicon thin film transistor (a-Si TFT). However, in an a-Si TFT, a variation in current caused by light is not sufficiently large. Accordingly, charges that are generated in a photodiode when light is applied are accumulated in a capacitor for a predetermined period of time, and then a signal regarding light intensity is generated based on the amount of charges accumulated in the capacitor. However, when using the capacitor, parasitic capacitance may increase as the size of the optical touch screen increases.

SUMMARY

Example embodiments include optical touch screen apparatuses in which an oxide semiconductor transistor is used as a light sensing device and/or methods of driving the optical touch screen apparatuses.

According to one example embodiment, an optical touch screen apparatus includes an array including a plurality of light sensing pixels for sensing incident light, a gate driver for providing each of the light sensing pixels with a gate voltage and a reset signal, and a signal output unit for receiving a light sensing signal from each of the plurality of light sensing pixels to output a data signal. The gate driver includes a plurality of gate lines that provide a gate voltage to each of the light sensing pixels and at least one reset line that provides a reset signal to each of the light sensing pixels and is electrically connected to the plurality of light sensing pixels. The plurality of light sensing pixels of the array may be arranged in a plurality of columns and rows.

The plurality of gate lines may be aligned along a row direction, and each of the gate lines may be connected to some of the light sensing pixels that are aligned along a same row. The signal output unit may include a plurality of data lines that are aligned along a column direction, and each of the data lines may be connected to some of the light sensing pixels aligned along a same column. Each of the light sensing pixels may include a light sensing transistor for sensing light and a switching transistor for outputting a light sensing signal from the light sensing transistor.

The gate line may be connected to a gate of the switching transistor, and the reset line may be connected to a gate of the light sensing transistor. The light sensing transistor may include an oxide semiconductor transistor in which an oxide semiconductor is used as a material of a channel layer. The oxide semiconductor may include one selected from the group consisting of ZnO or a material, in which at least one selected from the group consisting of Hf, Y, Ta, Zr, Ti, Cu, Ni, Cr, In, Ga, Al, Sn, and Mg is mixed with the ZnO.

According to another example embodiment, an optical touch screen apparatus includes an array of a plurality of pixels that display an image and sense incident light and are arranged in a plurality of columns and rows, a gate driver providing each of the plurality of pixels with a gate voltage and a reset signal, a data driver providing each of the pixels with an image signal, and a signal output unit receiving a light sensing signal from each of the plurality of pixels to output a data signal. The gate driver includes a plurality of gate lines providing a gate voltage to each of the pixels and at least one reset line that provides a reset signal to the plurality of pixels and is electrically connected to the plurality of pixels.

The plurality of gate lines may be aligned along a row direction, and each of the gate lines may be connected to some of the plurality of pixels aligned along a same row. The signal output unit may include a plurality of light sensing data lines aligned along a column direction, and each of the light sensing data lines may be connected to some of the plurality of pixels aligned along a same column. The data driver may include a plurality of image data lines aligned along a column direction, and each of the image data lines may be connected to a plurality of pixels that are aligned along a same column to provide an image signal that is to be displayed on each of the pixels.

Each of the pixels may include a display pixel unit displaying an image and a light sensing pixel unit sensing incident light, and the display pixel unit may include a display cell and a first switching transistor turning on/off the display cell. The light sensing pixel unit includes a light sensing transistor for sensing incident light and a second switching transistor for outputting a light sensing signal from the light sensing transistor. Gates of the first and second switching transistor may be connected to the plurality of gate lines, and a gate of the light sensing transistor may be connected to the at least one reset line.

The array of pixels may include a first pixel including only a display pixel unit for displaying an image and a second pixel including the display pixel unit and a light sensing pixel unit for sensing incident light. The display pixel unit may include a display cell and a first switching transistor for turning on/off the display cell, and the light sensing pixel unit may include a light sensing transistor for sensing incident light and a second switching transistor for outputting a light sensing signal.

According to still other example embodiments, a method of driving an optical touch screen includes simultaneously resetting a plurality of light sensing pixels in an optical touch screen apparatus when scanning of each frame of the optical touch screen apparatus is finished or just before scanning of each frame starts.

The method may include sequentially applying a gate voltage to an array including a plurality of light sensing pixels row by row to sequentially output a light sensing signal row by row and simultaneously resetting the plurality of light sensing pixels by providing a reset signal to all of the plurality of light sensing pixels at once. The gate voltage and the reset signal may be provided from a single data driver. The data driver may provide the gate voltage and the reset signal sequentially. Each of the light sensing pixels may include a light sensing transistor for sensing light and a switching transistor for outputting the light sensing signal from the light sensing transistor, and the gate voltage may be provided to a gate of the switching transistor, and the reset signal is provided to a gate of the light sensing transistor.

According to at least one example embodiment, an optical touch screen apparatus includes an array including a plurality of light sensing pixels configured to sense light, a gate driver configured to supply each of the light sensing pixels with a gate voltage using a plurality of gate lines and a reset signal using at least one reset line, and a signal output unit configured to receive a light sensing signal from each of the plurality of light sensing pixels and to output a data signal.

According to at least one example embodiment, an optical touch screen apparatus includes an array including a plurality of first pixels configured to display an image and sense incident light, the first pixels in a plurality of columns and a plurality of rows, a gate driver configured to supply each of the first pixels with a gate voltage using a plurality of gate lines and a reset signal using at least one reset line, a data driver configured to supply each of the first pixels with an image signal and a signal output unit configured to receive a light sensing signal from each of the first pixels and to output a data signal.

According to at least one example embodiment, an optical touch screen apparatus includes an n×m array of light sensing pixels, n and m each being a positive integer greater than 1, and a gate driver configured to simultaneously apply a reset signal to each of the light sensing pixels.

According to at least one example embodiment, a method of driving an optical touch screen includes scanning a plurality of light sensing pixels of an optical touch screen apparatus during a plurality of frames, and resetting the plurality of light sensing pixels simultaneously each frame one of upon finishing of the scanning and just before beginning of the scanning.

BRIEF DESCRIPTION OF THE DRAWINGS

Example embodiments will be more clearly understood from the following brief description taken in conjunction with the accompanying drawings.

FIG. 1 is a schematic block diagram illustrating circuit structures of optical touch screen apparatuses according to at least one example embodiment;

FIG. 2 is a circuit diagram illustrating light sensing pixels of an optical touch screen apparatus of FIG. 1;

FIG. 3 is a schematic cross-sectional diagram illustrating examples of oxide semiconductor transistors usable as light sensing devices in a light sensing pixel of FIG. 2;

FIG. 4 is a graph illustrating operational characteristics of an oxide semiconductor transistor illustrated in FIG. 3;

FIG. 5 is a timing diagram illustrating methods of driving an optical touch screen apparatus of FIG. 1 according to at least one example embodiment;

FIG. 6 is a circuit diagram illustrating pixels of optical touch screen apparatuses according to at least one example embodiment;

FIG. 7 is a schematic block diagram illustrating circuit structures of optical touch screen apparatuses including pixels of FIG. 6 according to at least one example embodiment;

FIG. 8 is a schematic circuit diagram illustrating pixel arrays of optical touch screen apparatuses according to at least one example embodiment; and FIG. 9 is a perspective view illustrating display devices including optical touch panels and methods of remotely controlling display devices using a light source according to at least one example embodiment.

Figure 1:
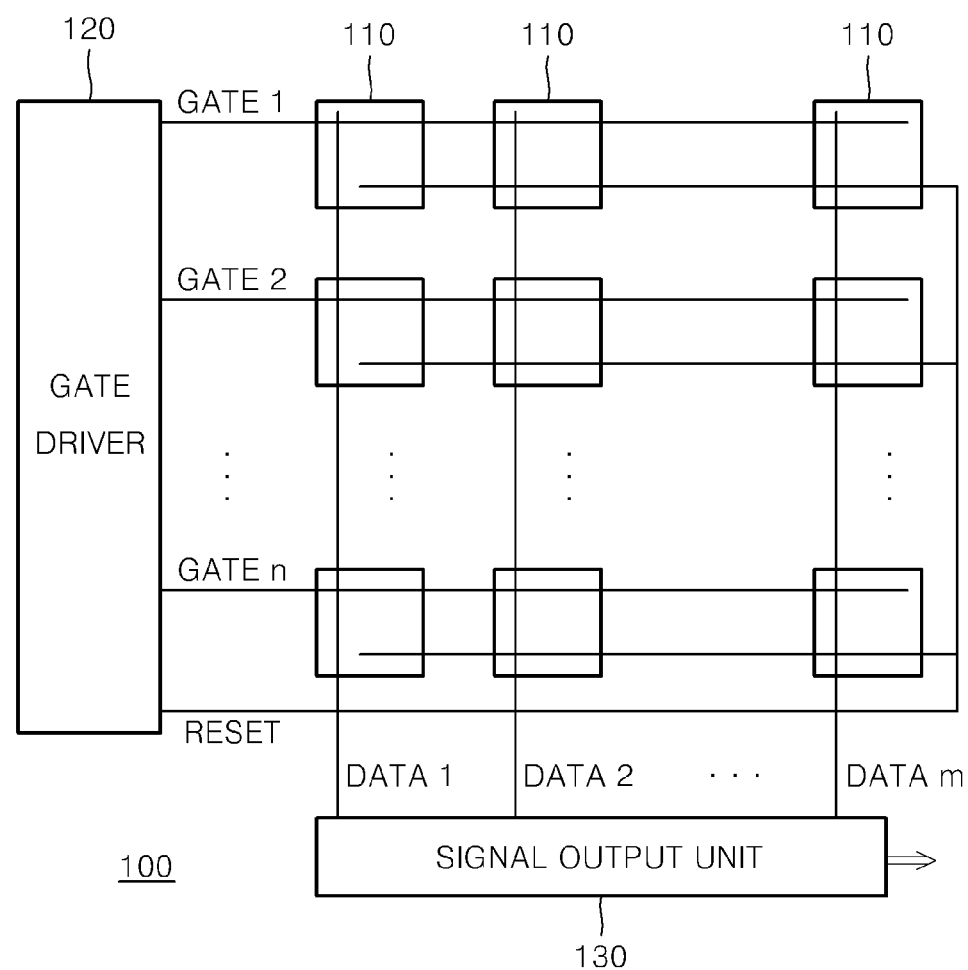
FIGS. 1-9 represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and theft shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a schematic block diagram illustrating circuit structures of optical touch screen apparatuses according to at least one example embodiment. Referring to FIG. 1 an optical touch screen apparatus 100 may include a plurality of light sensing pixels 110 sensing incident light, a gate driver 120 sequentially providing a gate voltage and a reset signal to each of the plurality of light sensing pixels 110, and a signal output unit 130 receiving a light sensing signal from each of the light sensing signals 110 to output a data signal.

The plurality of light sensing pixels 110 may be aligned in a plurality of columns and rows. For example, the plurality of light sensing pixels 110 may be arranged in an array with n rows and m columns (n and m each being any positive integer). The gate driver 120 may control the light sensing pixels 110 by individually activating each of the light sensing pixels 110 so that a light sensing signal is output from each of the light sensing pixels 110. The gate driver 120 may include a plurality of gate lines GATE1, GATE2, . . . , GATEn arranged in a row direction (e.g. the gate lines extend in a row direction) and one reset line RESET. Each gate line may be connected to all light sensing pixels 110 aligned along a same row. For example, a first gate line GATE1 may be connected to all light sensing pixels 110 aligned along a first row, and an n-th gate line GATEn may be connected to all light sensing pixels 110 aligned along an n-th row. The reset line RESET may provide the light sensing pixels 110 with a reset signal that initializes the light sensing pixels 110.

One reset line RESET may be connected at once to all of the light sensing pixels 110 in the optical touch screen apparatus 100. After a light sensing signal is output from the light sensing pixels 110 aligned along the n-th row, all of the light sensing pixels 110 may be initialized at the same time via the one reset line RESET. While one reset line RESET is illustrated in FIG. 1 only, example embodiments are not limited thereto. For example, according to other example embodiments, a plurality of reset lines RESET may be connected to the plurality of light sensing pixels 110, and a reset signal may be provided to all of the light sensing pixels 110 via the plurality of reset lines RESET.

The signal output unit 130 may receive the light sensing signal generated from each of the light sensing pixels 110 to output a data signal. The signal output unit 130 may include a plurality of data lines DATA1, DATA2, . . . , DATAm aligned along a column direction (e.g., the data lines may extend in the column direction). Each of the data lines DATA1, DATA2, . . . , DATAm may be connected to all light sensing pixels 110 in a same column. For example, a first data line DATA1 may be connected to all light sensing pixels 110 aligned along a first column, and an m-th data lines DATAm may be connected to all light sensing pixels 110 aligned along an m-th column. The signal output unit 130 may receive all light sensing signals that are generated in light sensing pixels 110 aligned along a same row at the same time via the plurality of data lines DATA1, DATA2, . . . , DATAm. For example, when a gate signal is applied to the first gate line GATE1, all light sensing signals generated in the light sensing pixels 110 aligned along the first row may be input to the signal output unit 130. The signal output unit 130 may be configured so as to convert the light sensing signals into digital data and sequentially output the converted light sensing signals column by column.

Figure 2:
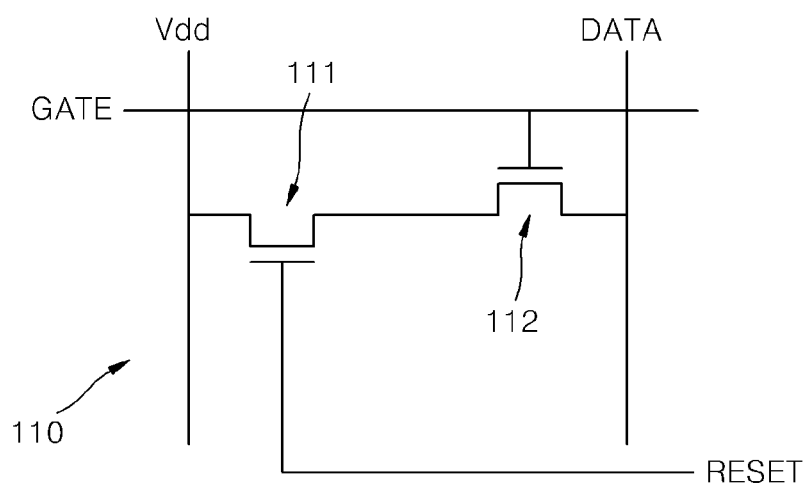

FIG. 2 is a circuit diagram illustrating light sensing pixels of an optical touch screen apparatus of FIG. 1. Referring to FIG. 2, a light sensing pixel 110 may include one light sensing transistor 111 and one switching transistor 112 that are serially connected to each other. A source of the light sensing transistor 111 may be connected to a drain of the switching transistor 112. The light sensing transistor 111 may be a light sensing device that senses light, for example, an oxide semiconductor. The switching transistor 112, which is used to output a light sensing signal, may be a typical thin film transistor (TFT) with no photosensitivity.

The light sensing pixels 110 may include a gate line GATE connected to a gate of the switching transistor 112, a data line DATA connected to a source of the switching transistor 112, a driving voltage line Vdd connected to a drain of the light sensing transistor 111, and a reset line RESET connected to a gate of the light sensing transistor 111. The gate line GATE connected to the gate of the switching transistor 112 may be one of the plurality of gate lines GATE1, GATE2, ..., GATEn connected to the gate driver 120 illustrated in FIG. 1. The data line DATA connected to the source of the switching transistor 112 may be one of the plurality of data lines DATA1, DATA2, ..., DATAm of the signal output unit 130. The reset line RESET may be connected to the gate driver 120 illustrated in FIG. 1.

In a light sensing pixel 110, when a gate voltage is applied to the switching transistor 112 via the gate line GATE, the switching transistor 112 may be turned on. A current may flow from the source of the light sensing transistors 111 to the data line DATA. An amount of current flowing from the light sensing transistor 111 to the data line DATA may vary according to the intensity of light that is incident on the light sensing transistor 111. The intensity of light incident on the light sensing transistor 111 may be determined by measuring the amount of current flowing through the data line DATA. While a gate voltage is not applied to the switching transistor 112, the switching transistor 112 may be turned off, and no current may flow to the data line DATA.

Figure 3:
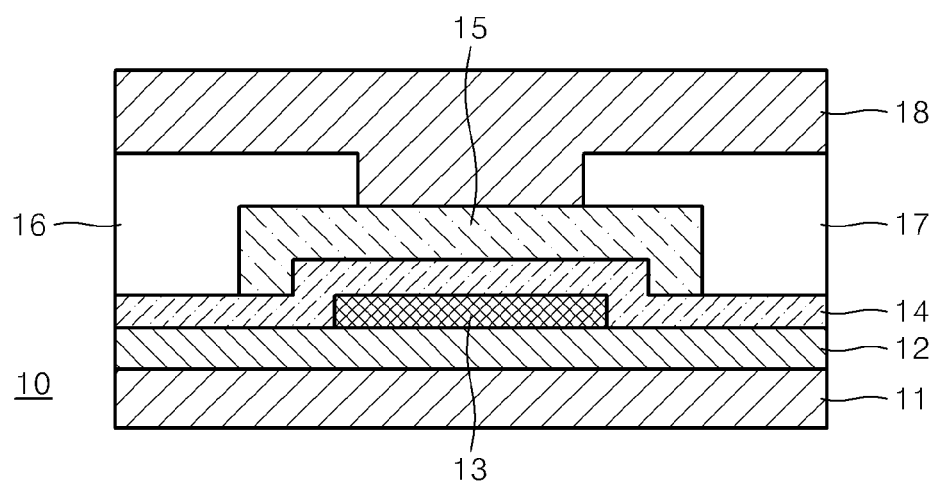

FIG. 3 is a schematic cross-sectional diagram illustrating examples of oxide semiconductor transistors usable as light sensing devices in a light sensing pixel described with respect to FIG. 2. An oxide semiconductor transistor is a transistor in which an oxide semiconductor is used as a channel material. Referring to FIG. 3, an oxide semiconductor transistor 10 may include a substrate 11, an insulation layer 12 over the substrate 11, a gate 13 partially on the insulation layer 12, a gate insulation layer 14 on the insulation layer 12 and the gate 13 so as to cover at least a portion around the gate 13, a channel layer 15 on the gate insulation layer 14, a source 16 and a drain 17 covering two respective sides of the channel layer 15, and a transparent insulation layer 18 covering the source 16, the drain 17 and the second channel layer 15. While a bottom gate type oxide semiconductor transistor 10 in which the gate 13 is below the channel layer 15 is illustrated in FIG. 3, an oxide semiconductor transistor 10 may be of a different structure (e.g., a top gate structure and/or a dual gate structure).

The substrate 11 may be a typical substrate material, for example, glass, silicon, etc. The insulation layer 12, the gate insulation layer 14, and the transparent insulation layer 18 may be, for example, silicon dioxide ($SiO_2$). If the substrate 11 includes an insulation material, the insulation layer 12 may be omitted. The gate 13, the source 16, and the drain 17 may include, for example, a conductive metal and/or a conductive metal oxide. If the oxide semiconductor transistor 10 is to be transparent, the gate 13, the source 16, and the drain 17 may include a transparent conductive material, for example, indium tin oxide (ITO). If the oxide semiconductor transistor 10 is not to be transparent, the substrate 11, the insulation layer 12, the gate 13, the gate insulation layer 14, the source 16, and the drain 17 may not necessarily be transparent.

The channel layer 15 may be an oxide semiconductor material. The oxide semiconductor transistor 10 may be sensitive to light according to the material of an oxide semiconductor selected as the material of the channel layer 15. For example, a ZnO-based oxide semiconductor may be used as the material of the channel layer 15. Examples of the ZnO-based oxide semiconductor may include ZnO and/or compounds including at least one of Hf, Y, Ta, Zr, Ti, Cu, Ni, Cr, In, Ga, Al, Sn, and/or Mg mixed with ZnO. Examples of the oxide semiconductor material include ZnO, TaZnO, InZnO (IZO) and/or GaInZnO (GIZO). When one or more of these materials is used to form the channel layer 15, the oxide semiconductor transistor 10 illustrated in FIG. 3 may be used as a light sensing device because characteristics of these materials include a threshold voltage or a drain voltage varying according to a wavelength of incident light or the amount of light.

Figure 4:
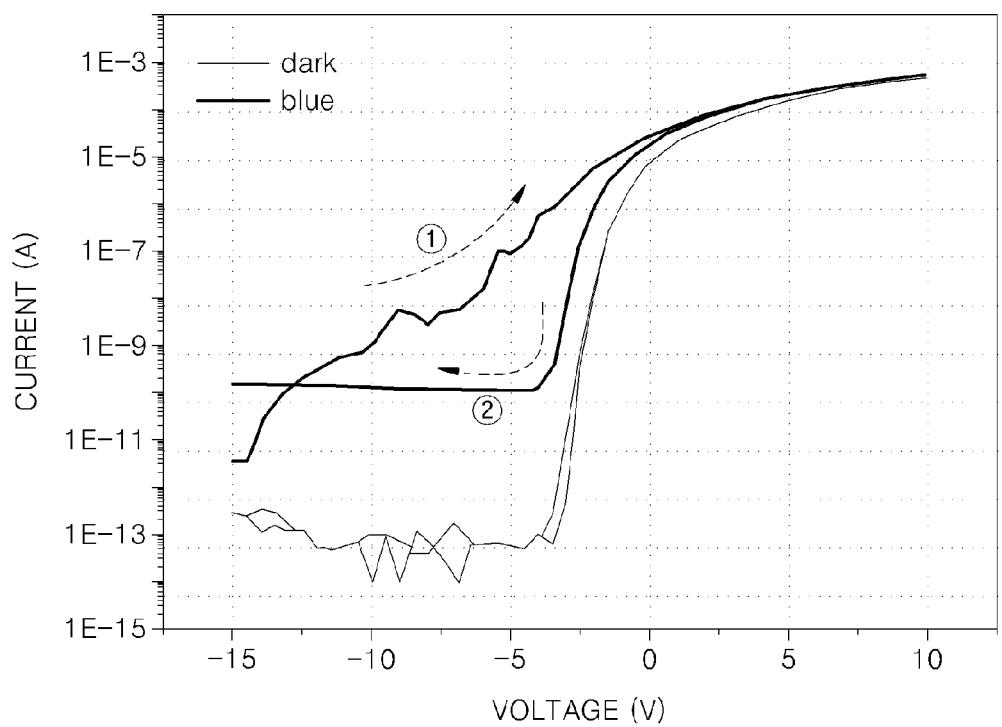

FIG. 4 is a graph illustrating operating characteristics of an oxide semiconductor transistor illustrated in FIG. 3. Drain current characteristics with respect to a gate voltage are illustrated. Referring to FIG. 4, when light is incident on the oxide semiconductor transistor 10, a drain current may significantly increase at a gate voltage less than or equal to a threshold voltage (that is, when the oxide semiconductor transistor 10 is turned off) compared to when light is not incident. A current ratio between a drain current when light is incident on the oxide semiconductor transistor 10 and a drain current when light is not incident thereon may be relatively great.

When an oxide semiconductor transistor 10 is used as a light sensing device, various effects may be obtained. For example, a current ratio of the oxide semiconductor transistor 10 may be a large current ratio, and a photocurrent of relatively large amplitude (e.g., several tens of nA to several hundreds of nA) may be generated when light is incident. When an oxide semiconductor transistor 10 is used as a light sensing device, as illustrated in FIG. 2, a light sensing pixel 110 may include the light sensing transistor 111 and the switching transistor 112 without a capacitor. A large size optical touch screen apparatus 100 may be manufactured, a driving speed thereof may be increased and consumption power may be reduced.

When light is incident, an oxide semiconductor transistor 10 may exhibit different characteristics according to a sweep direction of a gate voltage. For example, a first graph '①' illustrates a case where sweeping is performed in a direction in which a gate voltage is increased from a negative voltage to a positive voltage, and a second graph '②' illustrates a case where sweeping is performed in a direction in which a gate voltage is reduced from a positive voltage to a negative voltage. As depicted in the first graph, when the gate voltage is swept in a positive direction, a threshold voltage of the oxide semiconductor transistor 10 moves in a negative direction when light is incident. When the gate voltage is swept in a negative direction as depicted in the second graph, the threshold voltage of the oxide semiconductor transistor 10 is maintained the same as when light is incident and only an off-current increases. If the gate voltage is swept in the positive direction as depicted in the first graph, the drain current is not lowered even when light is no longer incident to the oxide semiconductor transistor 10. Dependency of the drain current on light may be decreased (e.g., may hardly occur).

The difference in the characteristics according to the sweeping direction of the gate voltage may be understood to occur as charges are trapped inside the channel layer 15 of the oxide semiconductor transistor 10 or in an interface of the channel layer 15. For example, when a large negative voltage (for example, a voltage lower than a threshold voltage) is applied to a gate with light, holes generated by light in the channel layer 15 may move to the interface between the gate insulation layer 14 and the channel layer 15 and be trapped. The trapped charges are not removed until a sufficiently great amount of voltage is applied to the gate. Once charges are trapped, it may be understood that the drain current is not lowered even when light is no longer incident. This phenomenon disappears when the trapped charges are removed by applying a positive voltage to the gate. The photosensitive characteristics of the oxide semiconductor transistor 10 may decrease due to charge trapping generated while a negative voltage is being applied to the gate, and accordingly, the oxide semiconductor transistor 10 is periodically initialized by applying a positive voltage to the gate.

Referring to FIG. 1, the reset line RESET of the gate driver 120 may apply (e.g., periodically apply) a positive gate voltage to the light sensing transistor 111 in the light sensing pixels 110 (see FIG. 2) to maintain the photosensitive characteristics of the light sensing transistor 111.

Figure 5:
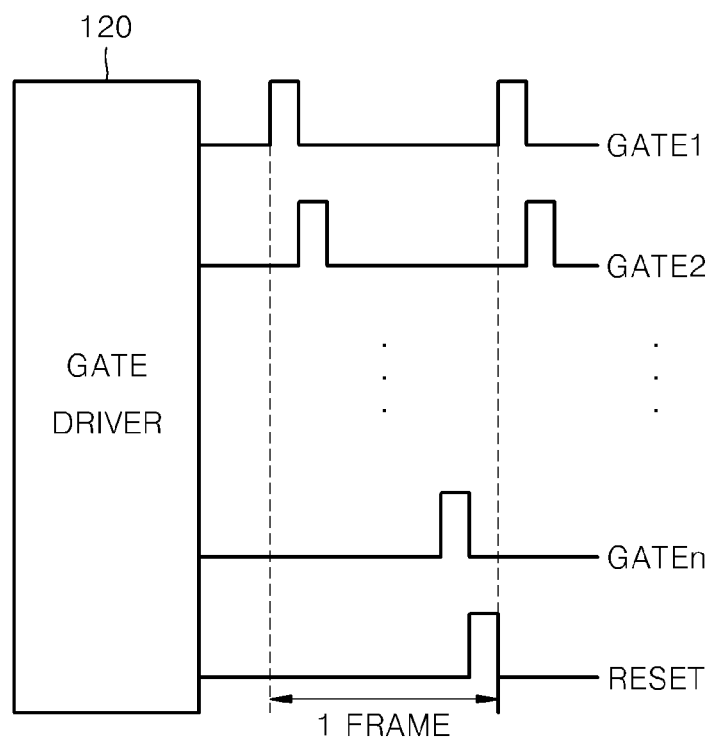

FIG. 5 is a timing diagram illustrating methods of driving an optical touch screen apparatus of FIG. 1 according to at least one example embodiment. The optical touch screen apparatus 100 illustrated in FIG. 1 may include an oxide semiconductor transistor 10 as a light sensing transistor 111 according to at least one example embodiment.

Referring to FIG. 5, a high voltage HIGH may be applied by the gate driver 120 via the first gate line GATE1 (a voltage greater than or equal to a threshold voltage of the switching transistor 112) to output a light sensing signal from the light sensing pixels 110 of the first row. A low voltage LOW may be applied to other (e.g., all other) of the gate lines GATE2-GATEn and the reset line RESET. The gate driver 120 may apply a high voltage HIGH via the second gate line GATE2 to output a light sensing signal from the light sensing pixels 110 of the second row. A low voltage LOW may be applied to other (e.g., all other) of the gate lines GATE1 and GATE3-GATEn and the reset line RESET. After outputting a light sensing signal from the light sensing pixels 110 of the n-th row in this manner, a high voltage may be applied to the reset line RESET. The reset line RESET is connected to all of the light sensing pixels 110, and all of the light sensing transistors 111 in all of the light sensing pixels 110 may be initialized at the same time.

A light sensing operation during one frame may be completed, and light sensing operations of next frames may be performed in the same order as described above. When scanning of each frame is finished, all of the light sensing transistors 111 in all of the light sensing pixels 110 may be initialized at the same time. According to example embodiments, initialization of the light sensing transistors 111 may be first performed. For example, before scanning of each frame starts, the light sensing transistors 111 in all of the light sensing pixels 110 may be initialized at the same time. The initialization may be based on, for example, a horizontal synchronization signal and/or a vertical synchronization signal.

The optical touch screen apparatus 100 illustrated in FIG. 1 may include only one reset line RESET to which all of the light sensing pixels 110 are connected. By applying a high voltage via one reset line RESET, all of the light sensing transistors 111 in all of the light sensing pixels 110 may be initialized at the same time. Because the reset line RESET connected to the gate of the light sensing transistors 111 and the gate lines GATE1-GATEn connected to the gate of the switching transistors 112 are all connected to the same gate driver 120, the light sensing transistors 111 and the switching transistors 112 in the light sensing pixels 110 may be controlled using a single gate driver 120. An additional driver for respectively driving the light sensing transistors 111 and the switching transistors 112 may not be used. The configuration of the optical touch screen apparatus 100 may be simplified, space usability may be increased, and manufacturing costs and power consumption may be reduced.

Because space may be saved as described above, an in-cell type optical touch screen apparatus in which a display pixel and a light sensing pixel are integrated may be manufactured (e.g., easily manufactured).

Figure 6:
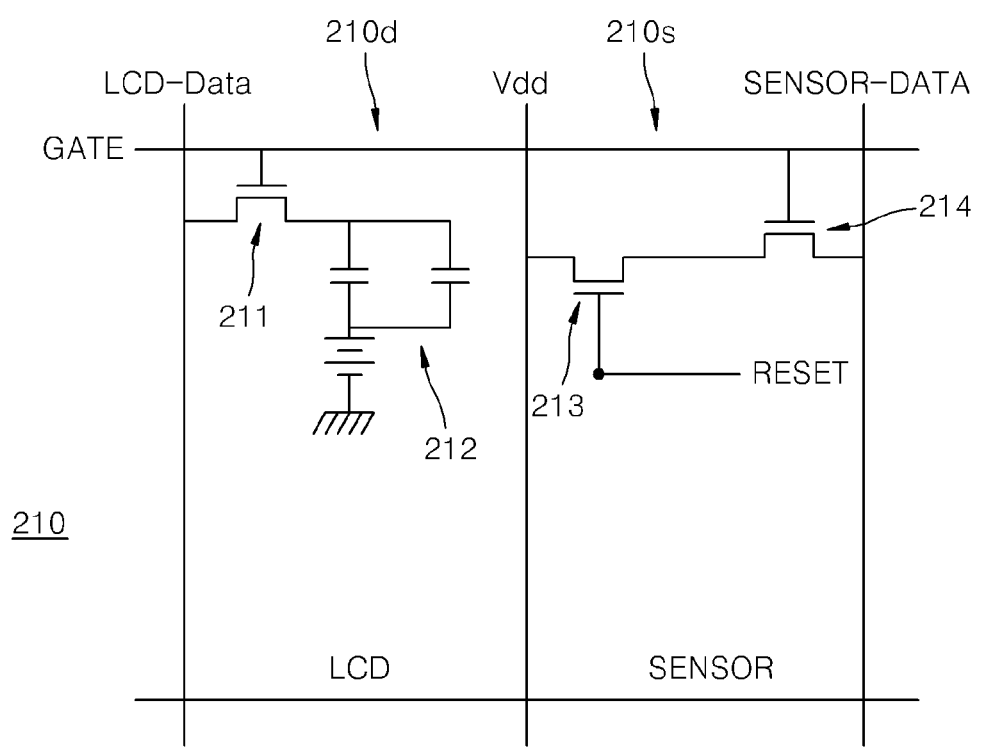

FIG. 6 is a circuit diagram illustrating pixels of optical touch screen apparatuses according to at least one example embodiment. Referring to FIG. 6, a pixel 210 of an in-cell type optical touch screen apparatus may include a display pixel unit 210d and a light sensing pixel unit 210s. The display pixel unit 210d may include a display cell 212 (e.g., a liquid cell of a liquid crystal display (LCD)) and a first switching transistor 211 for turning on/off of the display cell 212. The light sensing pixel unit 210s may include a light sensing transistor 213 for sensing incident light and a second switching transistor 214 for outputting a light sensing signal from the light sensing transistor 213.

Gates of the first and second switching transistors 211 and 214 may be connected to one gate line GATE. A drain of the first switching transistor 211 may be connected to an image data line LCD-Data, and a source of the first switching transistor 211 may be connected to the display cell 212. A source of the second switching transistor 214 may be connected to a light sensing data line SENSOR-DATA, and a drain of the second switching transistor 214 may be connected to a source of the light sensing transistor 213. The drain of the light sensing transistor 213 may be connected to a driving voltage line Vdd, and a gate of the light sensing transistor 213 may be connected to a reset line RESET.

Figure 7:
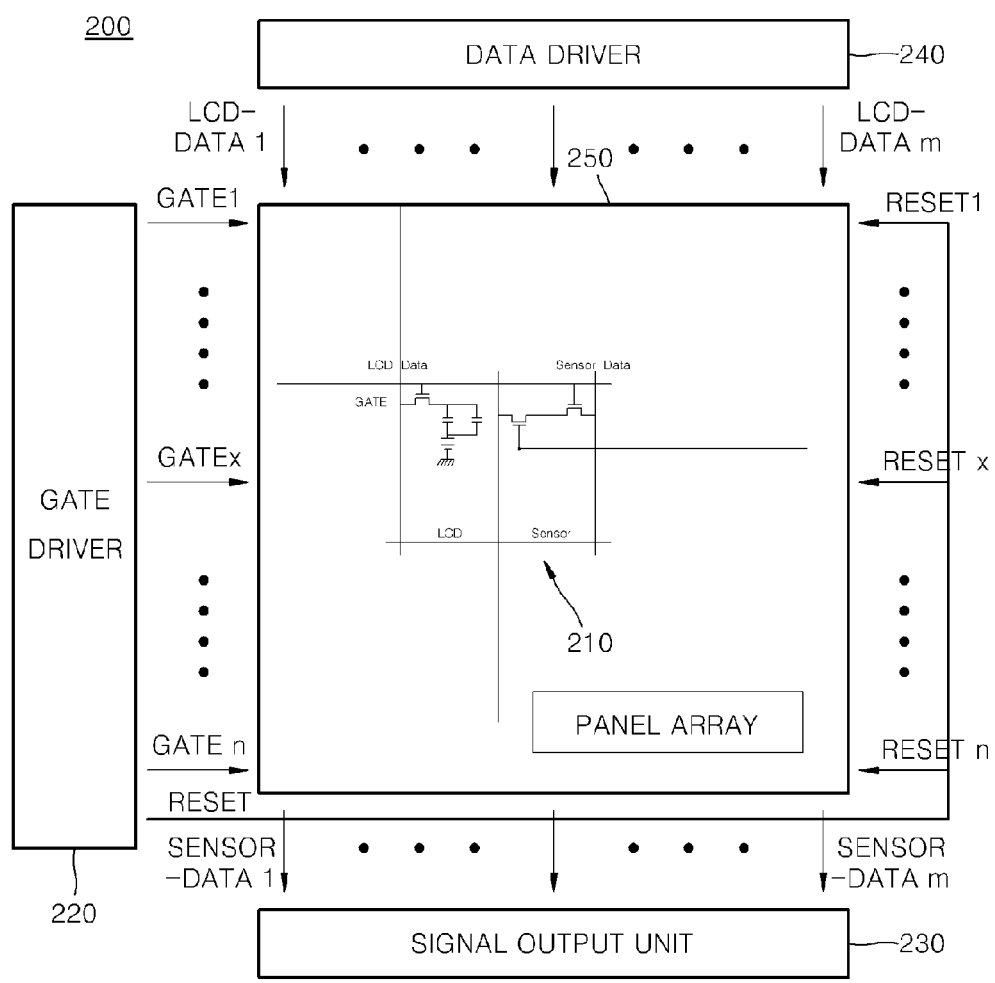

FIG. 7 is a schematic block diagram illustrating circuit structures of optical touch screen apparatuses including pixels of FIG. 6 according to at least one example embodiment. Referring to FIG. 7, an optical touch screen apparatus 200 may include a panel array 250 including a plurality of pixels 210 displaying an image and sensing incident light, a gate driver 220 sequentially providing a gate voltage and a reset signal to each of the pixels 210, a data driver 240 providing an image signal to each of the pixels 210, and a signal output unit 230 receiving the light sensing signal from each of the pixels 210 to output a data signal. While only one pixel 210 is illustrated in FIG. 7 for convenience, a plurality of pixels 210 may be aligned in an array.

As illustrated in FIG. 7, the gate driver 220 may include a plurality of gate lines GATE1-GATEn and one reset line RESET. Each of the gate lines GATE1-GATEn may be connected to all pixels 210 aligned along a same row. For example, a first gate line GATE1 may be connected to a gate of the first switching transistor 211 and a gate of the second switching transistor 214 in all of the pixels 210 aligned along a first row. The reset line RESET may be connected to all of the pixels 210 in the optical touch screen apparatus 200. The signal output unit 230 may include a plurality of light sensing data lines SENSOR-DATA1 through SENSOR-DATAm aligned along a column direction. Each of the light sensing data lines SENSOR-DATA1 through SENSOR-DATAm may be connected to all of the pixels 210 aligned along a same column. The signal output unit 230 may receive a light sensing signal from each of the pixels 210 via each of the light sensing data lines SENSOR-DATA1 SENSOR-DATAm to output a data signal. The data driver 240 may include a plurality of image data lines LCD-DATA1 through LCD-DATAm aligned in the column direction. Each of the image data lines LCD-DATA1 through LCD-DATAm may be connected to all of the pixels 210 aligned along the same column. The data driver 240 may provide an image signal to be displayed on each of the pixels 210 via each of the image data lines LCD-DATA1 through LCD-DATAm.

The optical touch screen apparatus 200 illustrated in FIG. 7 may include a display panel and an optical touch screen panel, which are integrated into a single panel, and may both display an image and sense incident light. For example, when a high voltage is applied to the first gate line GATE1, all of the pixels 210 aligned along the first row display an image and sense incident light at the same time to output a light sensing signal. After the pixels 210 aligned along an n-th row have displayed an image and output a light sensing signal, all of the light sensing transistors 213 in all of the pixels 210 may be initialized at the same time via one reset line RESET. Because the light sensing transistor 213 and the first and second switching transistors 211 and 214 may be controlled via a single gate driver, the gate driver 220, an additional driver is not required. In the optical touch screen apparatus 200 illustrated in FIG. 7, a plurality of driving units such as the gate driver 220, the signal output unit 230, and the data driver 240 may be easily disposed on a single substrate without spatial interference.

While all of the pixels 210 are illustrated as including the light sensing pixel units 210s in FIG. 7, the light sensing pixel units 210s may be included only in some of the pixels 210. In a general display panel, a single pixel has a width and height of about 200 µm to about 300 µm, but incident light has a beam diameter of about 2 mm, which is far greater than the width or height of each pixel. An incident position of incident light may be determined even if the light sensing pixel units 210s are only partially disposed.

Figure 8:
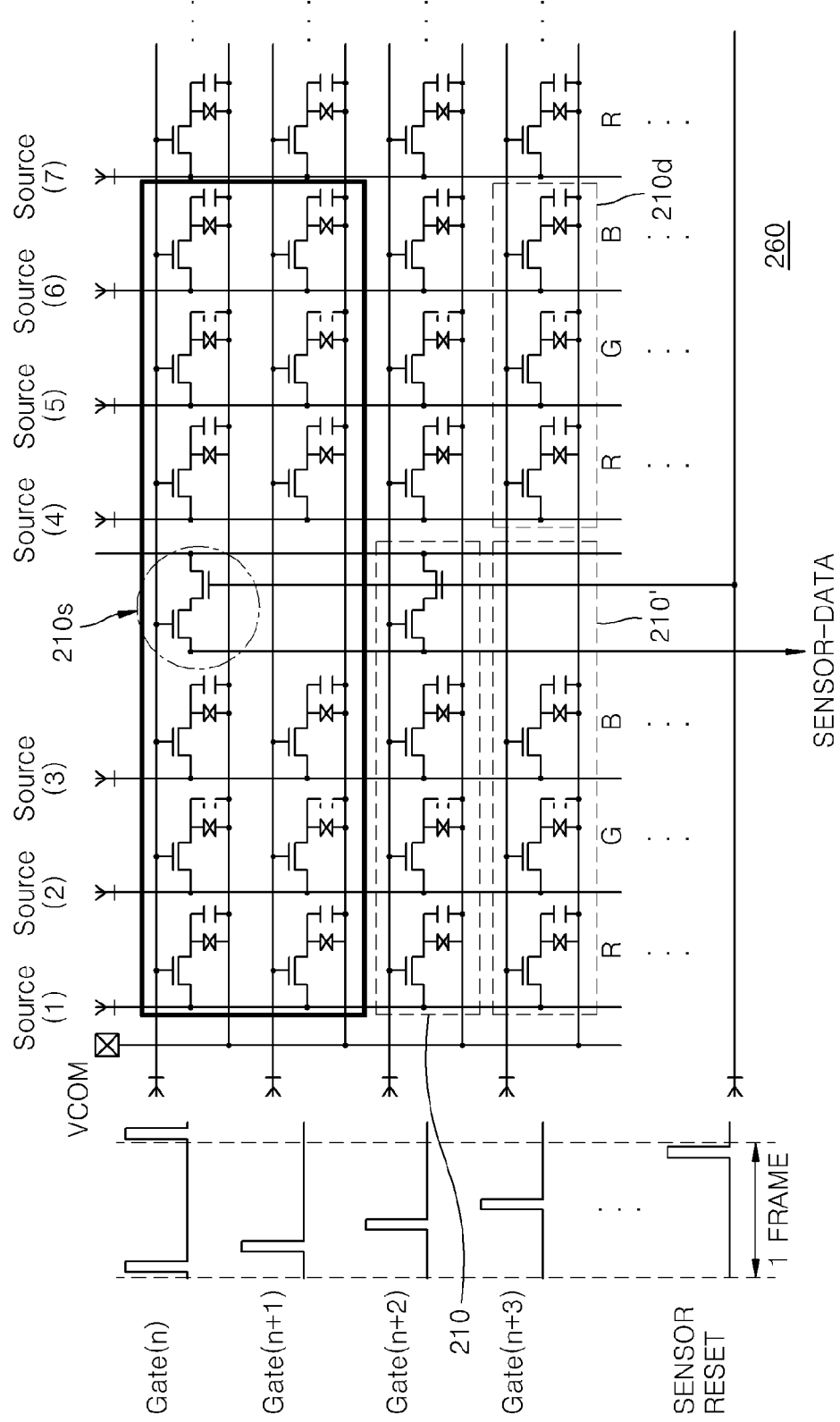

FIG. 8 is a schematic circuit diagram illustrating pixel arrays of optical touch screen apparatuses according to at least one example embodiment. FIG. 8 illustrates a structure of a pixel array 260 of an optical touch screen apparatus in which a number of the light sensing pixel units 210s may not be equal to a number of display pixel units 210d. Referring to FIG. 8, the pixel array 260 may include a pixel 210 in which the light sensing pixel units 210s are disposed and a pixel 210' in which the light sensing pixel units 210s are not disposed. The pixel 210' may include only a display pixel unit 210d. For example, the light sensing pixel unit 210s may be in every four pixels. However, the above-described structure is an example only, and a light sensing pixel unit 210a may be disposed for every three or less pixels or for every five or more pixels, and so on. Each display pixel unit 210d may further include a red sub-pixel R, a green sub-pixel G, and a blue sub-pixel B in order to represent colors.

Figure 9:
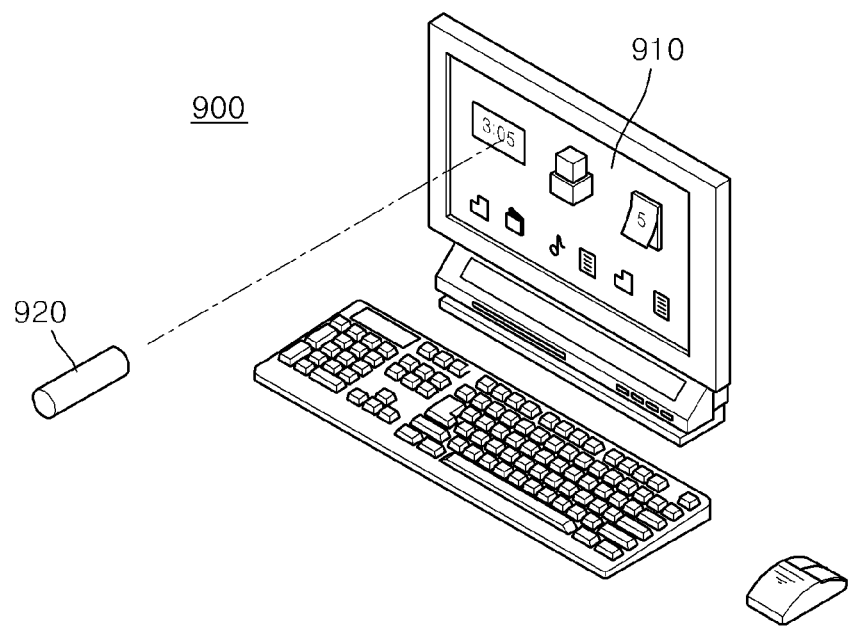

FIG. 9 is a perspective view illustrating display devices including optical touch panels and methods of remotely controlling display devices using a light source according to at least one example embodiment. Referring to FIG. 9, an optical touch screen system 900 may include a display device 910. The display device 910 may include at least one of the light sensing transistors, pixels and/or pixel arrays described above with respect to FIGS. 1-8, The display device 910 may be a device in which an optical touch panel is integrated in a display pixel as an in-cell type, and/or may be a device in which an optical touch panel is attached to a surface of the display device 910. In the optical touch screen system 900, if light is emitted to the display device 910 by using the simple light source device 920 (e.g., a laser pointer), for example, a light sensor TFT 10 arranged in the optical touch panel may sense the light. Accordingly, the same effect as touching a touch screen with a hand and/or a pen may be achieved.

While example embodiments have been particularly shown and described, it will be understood by one of ordinary skill in the art that variations in form and detail may be made therein without departing from the spirit and scope of the claims.

What is claimed is:

1. An optical touch screen apparatus, comprising:
an array including a plurality of light sensing pixels configured to sense light, the plurality of light sensing pixels being arranged in a plurality of columns and a plurality of rows;
a gate driver configured to supply each of the light sensing pixels with a gate voltage using a plurality of gate lines and a reset signal using at least one reset line, the plurality of gate lines and the at least one reset line extending in a row direction; and
a signal output unit including a plurality of data lines extending in a column direction, wherein
the plurality of gate lines and the at least one reset line are arranged row by row such that each of the plurality of gate lines and the at least one reset line are connected to the gate driver, and
each of the at least one reset line is connected to the plurality of light sensing pixels arranged in the plurality of rows.

2. The optical touch screen apparatus of claim 1, wherein at least one of the rows includes at least one of the gate lines and at least one of the light sensing pixels, the at least one of the gate lines connected to the at least one of the light sensing pixels.

3. The optical touch screen apparatus of claim 1, wherein at least one of the columns includes at least one of the data lines and at least one of the light sensing pixels, the at least one of the data lines connected to the at least one of the light sensing pixels.

4. The optical touch screen apparatus of claim 1, wherein each of the light sensing pixels includes,
a light sensing transistor configured to sense light, and
a switching transistor configured to output a light sensing signal from the light sensing transistor, the switching transistor being serially connected to the light sensing transistor, and
each of the light sensing pixels does not include a capacitor to store carriers generated by light.

5. The optical touch screen apparatus of claim 4, wherein each of the gate lines is connected to a gate of at least one of the switching transistors, and
the at least one reset line is connected to a gate of at least one of the light sensing transistors.

6. The optical touch screen apparatus of claim 4, wherein at least one of the light sensing transistors is an oxide semiconductor transistor.

7. The optical touch screen apparatus of claim 6, wherein an oxide semiconductor of the oxide semiconductor transistor includes one of ZnO and a material including ZnO mixed with at least one of Hf, Y, Ta, Zr, Ti, Cu, Ni, Cr, In, Ga, Al, Sn, and Mg.

8. An optical touch screen apparatus, comprising:
an array including a plurality of first pixels configured to display an image and sense incident light, the first pixels in a plurality of columns and a plurality of rows;
a gate driver configured to supply each of the first pixels with a gate voltage using a plurality of gate lines and a reset signal using at least one reset line, the plurality of gate lines and the at least one reset line extending in a row direction;
a data driver configured to supply each of the first pixels with an image signal; and a signal output unit including a plurality of light sensing data lines extending in a column direction, wherein
the plurality of gate lines and the at least one reset line are arranged row by row such that each of the plurality of gate lines and the at least one reset line are connected to the gate driver, and
each of the at least one reset line is connected to the plurality of first pixels arranged in the plurality of rows.

9. The optical touch screen apparatus of claim 8, wherein the plurality of gate lines extend in a row direction, and
at least one of the rows includes at least one of the gate lines and at least one of the first pixels, the at least one of the gate lines connected to the at least one of the first pixels.

10. The optical touch screen apparatus of claim 8, wherein the signal output unit is configured to receive a light sensing signal using the plurality of light sensing data lines, and
at least one of the columns includes at least one of the light sensing data lines and at least one of the first pixels, the at least one of the light sensing data lines connected to the at least one of the first pixels.

11. The optical touch screen apparatus of claim 8, wherein the data driver is configured to supply the image signal using a plurality of image data lines extending in a column direction, and
at least one of the columns includes at least one of the image data lines and at least one of the first pixels, the at least one of the image data lines connected to the at least one of the first pixels.

12. The optical touch screen apparatus of claim 8, wherein each of the first pixels includes a display pixel unit configured to display an image and a light sensing pixel unit configured to sense incident light,
the display pixel unit includes a display cell and a first switching transistor configured to turn on/off the display cell, and
the light sensing pixel unit includes a light sensing transistor configured to sense incident light and a second switching transistor configured to output a light sensing signal from the light sensing transistor, the second switching transistor being serially connected to the light sensing transistor, and
light sensing pixel unit does not include a capacitor to store carriers generated by light.

13. The optical touch screen apparatus of claim 12, wherein gates of the first and second switching transistor are connected to the plurality of gate lines, and
gates of the light sensing transistors are connected to the at least one reset line.

14. The optical touch screen apparatus of claim 12, wherein the light sensing transistor is an oxide semiconductor transistor.

15. The optical touch screen apparatus of claim 14, wherein an oxide semiconductor of the light sensing transistor includes at least one of ZnO and a material including ZnO mixed with at least one of Hf, Y, Ta, Zr, Ti, Cu, Ni, Cr, In, Ga, Al, Sn, and Mg.

16. The optical touch screen apparatus of claim 8, wherein the array includes at least one second pixel,
each of the first pixels include a light sensing pixel unit configured to sense incident light,
each of the first and second pixels includes a display pixel unit configured to display an image,
the second pixel does not include a light sensing pixel unit,
the display pixel unit includes a display cell and a first switching transistor configured to turn on/off the display cell, and
the light sensing pixel unit includes a light sensing transistor configured to sense incident light and a second switching transistor configured to output a light sensing signal.

17. A method of driving an optical touch screen, the method comprising:
scanning a plurality of light sensing pixels of an optical touch screen apparatus during a plurality of frames, the scanning including sequentially applying a gate voltage row-by-row to an array including the plurality of light sensing pixels to sequentially output a light sensing signal using a plurality of gate lines; and
resetting the plurality of light sensing pixels simultaneously, the resetting being performed upon finishing or just before of the scanning during each frame using at least one reset line, wherein
the plurality of gate lines and the at least one reset line are arranged row-by-row such that each of the plurality of gate lines and the at least one reset line are connected to a gate driver, and
each of the at least one reset line is connected to the plurality of light sensing pixels arranged in a plurality of rows.

18. The method of claim 17, wherein
the resetting includes simultaneously applying a reset signal to all of the plurality of light sensing pixels.

19. The method of claim 18, wherein the scanning and the resetting include supplying the gate voltage and the reset signal from a single data driver.

20. The method of claim 19, wherein the scanning and the resetting are sequentially performed.

21. The method of claim 18, wherein
the scanning includes sequentially applying the gate voltage to gates of a plurality of switching transistors to output the light sensing signal from each of a plurality of light sensing transistors, at least one of the switching transistors being included in each of the light sensing pixels, and
the resetting includes applying the reset signal to a gate of each of the light sensing transistors.

22. An optical touch screen apparatus, comprising:
an n×m array of light sensing pixels, n and m each being a positive integer greater than 1; and
a gate driver configured to apply a gate voltage to each of a plurality of the light sensing pixels using a plurality of gate lines and to simultaneously apply a reset signal to each of the plurality of the light sensing pixels using at least one reset line, wherein
the plurality of gate lines and the at least one reset line are arranged row-by-row such that each of the plurality of gate lines and the at least one reset line are connected to the gate driver, and
each of the at least one reset line is connected to the plurality of light sensing pixels arranged in a plurality of rows.

23. The optical touch screen apparatus of claim 22, wherein each of the light sensing pixels includes an oxide semiconductor transistor.

24. The optical touch screen of claim 23, wherein at least one of the oxide semiconductor transistors includes ZnO.

25. The optical touch screen of claim 23, wherein the gate driver is configured to apply the reset signal to a single reset line.

26. The optical touch screen of claim 25, wherein the single reset line includes a plurality of conductively connected segments, at least one of the segments at about a right angle to a different one of the segments.

27. The optical touch screen of claim 22, wherein the light sensing pixels do not include a capacitor to store carriers generated by light.

28. The optical touch screen of claim 27, further comprising:
- a signal output unit configured to output a digital data signal based on light intensity.

29. The optical touch screen of claim 22, wherein
the n×m array is part of a display including a panel array, and
the display is an in-cell type display including a plurality of display pixels and the light sensing pixels.

30. The optical touch screen of claim 22, wherein the gate driver is configured to simultaneously apply the reset signal to all of the light sensing pixels.

* * * * *